United States Patent
Ramachandran et al.

(10) Patent No.: US 9,013,617 B2
(45) Date of Patent: Apr. 21, 2015

(54) GYROSCOPE CONDITIONING AND GYRO-CAMERA ALIGNMENT

(71) Applicant: QUALCOMM Incorporated, San Diego, CA (US)

(72) Inventors: Mahesh Ramachandran, San Diego, CA (US); Christopher Brunner, San Diego, CA (US); Murali R. Chari, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 13/651,055

(22) Filed: Oct. 12, 2012

(65) Prior Publication Data
US 2014/0104445 A1  Apr. 17, 2014

(51) Int. Cl.
*H04N 5/222* (2006.01)
*G01C 25/00* (2006.01)
*G06T 7/00* (2006.01)

(52) U.S. Cl.
CPC .............. *G01C 25/00* (2013.01); *G06T 7/0042* (2013.01); *G06T 2207/10016* (2013.01); *G06T 2207/30244* (2013.01)

(58) Field of Classification Search
USPC ............. 348/333.01–333.09, 208.1–208.8, 348/208.11–208.16
IPC ....... H04N 5/228,5/232, 5/23251; G01C 19/00, G01C 19/02, 19/32, 19/34; G06T 7/004, G06T 7/0042, 2207/30244
See application file for complete search history.

(56) References Cited

U.S. PATENT DOCUMENTS

| 6,765,569 | B2 | 7/2004 | Neumann et al. |
| 2008/0249732 | A1 | 10/2008 | Lee et al. |
| 2010/0045701 | A1 | 2/2010 | Scott et al. |
| 2012/0176492 | A1* | 7/2012 | Garin ............... 348/116 |

OTHER PUBLICATIONS

Dissertation M.J., et al., "Fusion of Imaging and Inertial Sensors for Navigation Air Force Institute of Technology", Jan. 1, 2006, XP055093326, Retrieved from the Internet: URL: www.dtic.mil/cgi-bin/GetTRDoc?AD=ADA468382#x200E; [retrieved on Dec. 13, 2013] Sections: 2.2,2.5.2,2.6,2.8,3.3.3,IV,; figures 1.2,3.2.
International Search Report and Written Opinion—PCT/US2013/059797—ISA/EPO—Jan. 3, 2014.
Randeniya D.I.B., et al., "Vision—IMU Integration Using a Slow-Frame-Rate Monocular Vision System in an Actual Roadway Setting", IEEE Transactions on Intelligent Transportation Systems, IEEE, Piscataway , NJ, USA, vol. 11, No. 2, Jun. 1, 2010, pp. 256-266 , XP011347239, ISSN: 1524-9050, DOI : 10.1109/TITS.2009.2038276 Section IV.

(Continued)

*Primary Examiner* — Yogesh Aggarwal
(74) *Attorney, Agent, or Firm* — Silicon Valley Patent Group LLP

(57) ABSTRACT

An apparatus and method for generating parameters for an application, such as an augmented reality application (AR app), using camera pose and gyroscope rotation is disclosed. The parameters are estimated based on pose from images and rotation from a gyroscope (e.g., using least-squares estimation with QR factorization or a Kalman filter). The parameters indicate rotation, scale and/or non-orthogonality parameters and optionally gyroscope bias errors. In addition, the scale and non-orthogonality parameters may be used for conditioning raw gyroscope measurements to compensate for scale and non-orthogonality.

32 Claims, 7 Drawing Sheets

(56) References Cited

OTHER PUBLICATIONS

Hol, et al., "Relative Pose Calibration of a Spherical Camera and an IMU," 7th IEEE ACM International Symposium on Mixed and Augmented Reality, Sep. 15-18, 2008, pp. 21-24.

Hol, "Pose estimation and calibration algorithms for vision and intertial sensors," Linkoping University, Retrieved from the Internet at liu.diva-portal.org/smash/get/diva2:18254/FULLTEXT01, 107 pages, (2008).

Jones, et al., "Visual-Inertial Navigation, Mapping and Localization: A Scalable Real-Time Causal Approach," International Journal of Robotics Research, Sep. 23, 2010, pp. 1-38.

Mirzaei, et al., "A kalman filter-based algorithm for IMU-camera calibration," Proceedings of the 2007 IEEE/RSJ International Conference on Intelligent Robots and Systems, San Diego, CA USA, Oct. 29-Nov. 2, 2007, pp. 2427-2434.

Nebot, et al., "Initial calibration and alignment of low-cost inertial navigation units for land-vehicle applications," Journal of Robotics Systems, vol. 16, No. 2, Feb. 1999, pp. 81-92.

You.S., et al., "Hybrid inertial and vision tracking for augmented reality registration," In Proc. VR 1999, pp. 260-267, Houston, Texas, USA, Mar. 13-17, 1999.

* cited by examiner $$B = R_{cb} \cdot A$$

$$\begin{bmatrix} Composite \\ matrix \end{bmatrix} = \begin{bmatrix} Orthogonal \\ rotation \\ matrix \end{bmatrix} \cdot \begin{bmatrix} Upper \\ triangular \\ matrix \end{bmatrix}$$

410   420   430

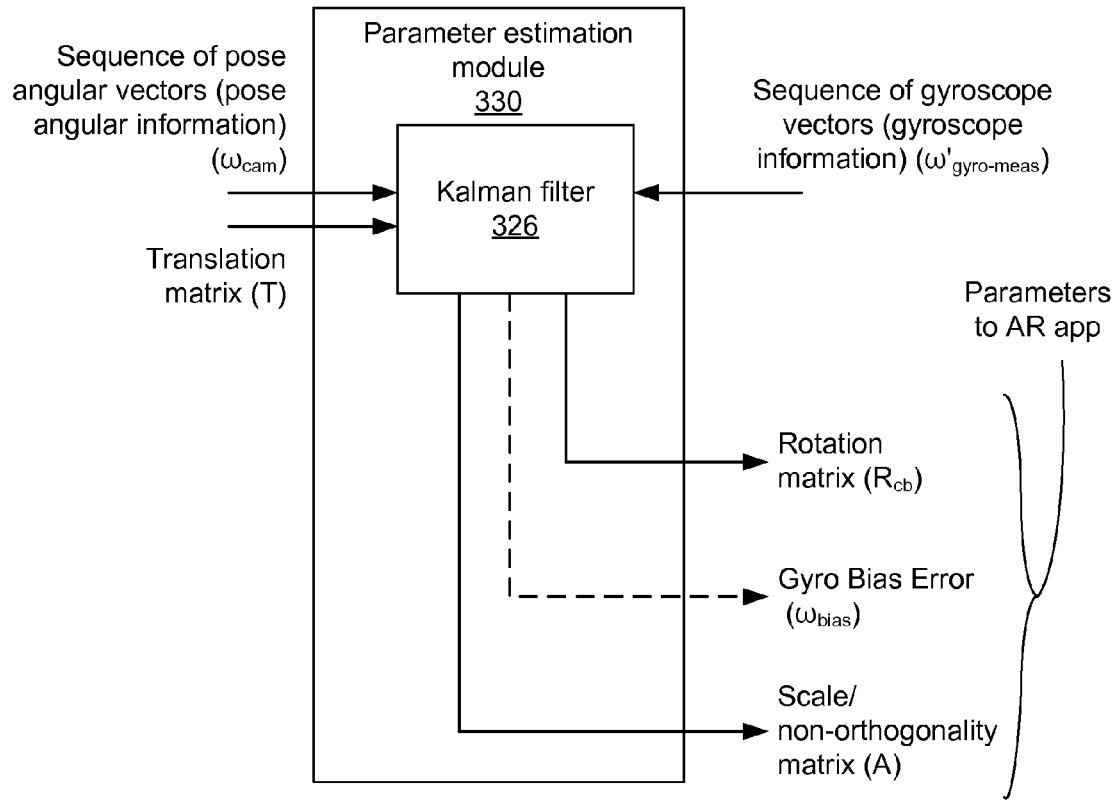

FIG. 7

$$\Omega_{cb}(t+dt) = \Omega_{cb}(t)$$

$$\Omega_{sb}(t+dt) = Log_{SO3}\left(\exp(\hat{\Omega}_{sb}(t)) \cdot \exp(w(t)dt)\right)$$

$$\omega(t+dt) = \omega(t) + n_w(t)$$

$$T_{sb}(t+dt) = T_{sb}(t) + v(t)dt$$

$$v(t+dt) = v(t) + \exp(\hat{\Omega}_{sb}(t)) \cdot a(t)dt + \gamma dt$$

$$a(t+dt) = a(t) + n_a(t)$$

$$\gamma(t+dt) = \gamma(t) + n_\gamma(t)$$

$$\omega_{bias}(t+dt) = \omega_{bias}(t)$$

$$\omega_{imu}(t) = S(t) \cdot \omega(t) + \omega_{bias}(t) + n_w(t)$$

$$\Omega_{camc}(t_k) = Log_{SO3}\left(\exp(\hat{\Omega}_{sb}(t_k)) \cdot \exp(-\hat{\Omega}_{cb})\right) + n_{vis}(t_k)$$

$$T_{cam}(t_k) = T_{sb} - \exp(\hat{\Omega}_{sb}(t_k)) \cdot \exp(-\hat{\Omega}_{cb}) \cdot T_{cb} + n_{vis}(t)$$

FIG. 8

GYROSCOPE CONDITIONING AND GYRO-CAMERA ALIGNMENT

CROSS-REFERENCE TO RELATED APPLICATIONS

Not applicable.

BACKGROUND

I. Technical Field

This disclosure relates to systems, apparatus and methods for generating parameters used in applications, for example, augmented reality applications, and in some aspects used in conditioning gyroscope measurements.

II. Background

An increasing number of modern smartphones include one or more cameras and various sensors. Inertial sensors, such as gyroscopes and accelerometers, which sense motion, are especially important due to their ability to measure angular velocity and acceleration and at high sampling rates. These sensors can be used to enhance augmented reality (AR) applications on a smartphone. In reference-based tracking, the primary causes of tracking failure include fast rotation and camera drift away relative to the target. The gyroscope can help maintain tracking of the target during periods of camera related tracking failure. However, it is often difficult to condition the gyroscope, for example, to accurately calibrate the alignment of gyroscope with respect to the camera and to determine the scale and non-orthogonality parameters of the gyroscope.

Therefore, a need exists to obtain and maintain accurate calibration of the gyroscope. Accurate and low cost calibration of a gyroscope can be beneficial for use with a variety of applications, such as AR applications.

SUMMARY

According to some aspects, disclosed is a method in a mobile device for generating parameters for an application of the mobile device, the method comprising: receiving a sequence of images from a camera; applying a computer vision algorithm to the sequence of images to generate pose angular information; estimating gyroscope information from a sequence of gyroscope measurements; and processing the pose angular information and the gyroscope information to derive at least two of: (1) rotation information, (2) scale information, and (3) non-orthogonality information, for use with the application. In some aspects, the method comprises processing the pose angular information and the gyroscope information to derive rotation information, scale information, and non-orthogonality information for use with the application.

According to some aspects, disclosed is a mobile device for generating parameters for an application of the mobile device, the mobile device comprising: a camera configured to provide a sequence of images; a gyroscope configured to generate a sequence of gyroscope measurements; and a processor coupled to the camera and the gyroscope, wherein the processor comprises: a computer vision module coupled to receive the sequence of images from the camera, wherein the computer vision module generates pose angular information based on the sequence of images; an angular velocity module to generate gyroscope information from the sequence of gyroscope measurements; and a parameter estimation module coupled to receive the pose angular information from the computer vision module and coupled to receive the gyroscope information from the angular velocity module, wherein the parameter estimation module derives at least two of rotation information, scale information, and non-orthogonality information for use with the application of the mobile device.

According to some aspects, disclosed is a mobile device for generating parameters for an application of the mobile device, the mobile device comprising: means for receiving a sequence of images from a camera; means for applying a computer vision algorithm to the sequence of images to generate pose angular information; means for estimating gyroscope information from a sequence of gyroscope measurements; and means for processing the pose angular information and the gyroscope information to derive at least two of rotation information, scale information, and non-orthogonality information for use with the application of the mobile device. In some aspects, the means for processing comprise means for processing the pose angular information and the gyroscope information to derive rotation information, scale information and non-orthogonality information for use with the application of the mobile device.

According to some aspects, disclosed is a mobile device for generating parameters for an application of the mobile device, the mobile device comprising a processor and a memory wherein the memory includes instructions for: receiving a sequence of images from a camera; applying a computer vision algorithm to the sequence of images to generate pose angular information; estimating gyroscope information from a sequence of gyroscope measurements; and processing the pose angular information and the gyroscope information to derive rotation information, scale information and non-orthogonality information for use with the application of the mobile device.

According to some aspects, disclosed is a non-transitory computer-readable storage medium including program code stored thereon for generating parameters for an application of a mobile device, the program code comprising program code for: receiving a sequence of images from a camera; applying a computer vision algorithm to the sequence of images to generate pose angular information; estimating gyroscope information from a sequence of gyroscope measurements; and processing the pose angular information and the gyroscope information to derive at least two of rotation information, scale information and non-orthogonality information for use with the application of the mobile device. In some aspects, the program code for processing comprises program code for processing the pose angular information and the gyroscope information to derive rotation information, scale information and non-orthogonality information for use with the application of the mobile device.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

Various embodiments are described below, by way of example only, with reference to the drawings.

FIG. 7 shows a block diagram of an additional exemplary parameter estimation module consistent with disclosed embodiments.

FIG. 8 shows a set of equations describing the relationships between various parameters in a mobile device.

DETAILED DESCRIPTION

Figure 1:
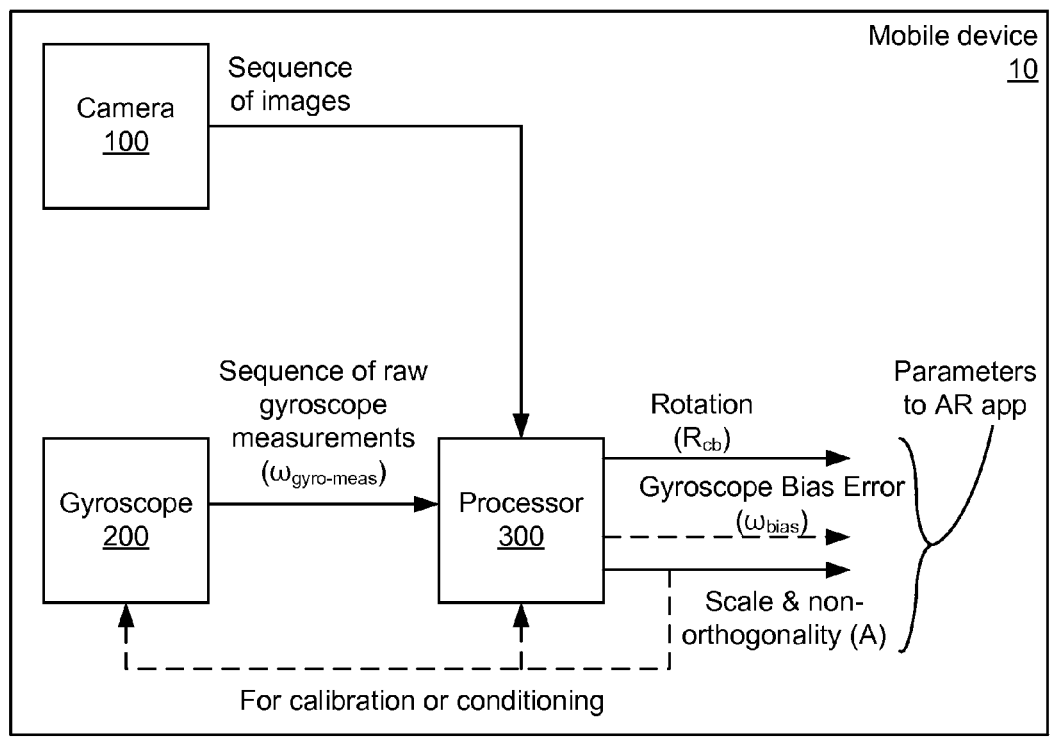
FIG. 1 shows a simplified block diagram of an exemplary mobile device, which is capable of generating a rotation matrix ($R_{cb}$) and scale and non-orthogonality matrix (A) and optionally gyroscope bias error ($\omega_{bias}$), in a manner consistent with disclosed embodiments.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As used herein, a mobile device, sometimes referred to as a mobile station (MS) or user equipment (UE), may comprise a cellular phone, mobile phone or other wireless communication device, personal communication system (PCS) device, personal navigation device (PND), Personal Information Manager (PIM), Personal Digital Assistant (PDA), tablet, laptop or other suitable mobile device which is capable of capturing or receiving images and capable of measuring or obtaining gyroscopic information. In some embodiments, a mobile station is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Thus, a mobile device may wirelessly communicate with one or more other devices, for example using cellular or WiFi technology, but may omit such functionality in other embodiments. Any operable combination of the above are also considered a "mobile device."

Teachings herein make it possible to generate rotation, scale and/or non-orthogonality parameters by processing a sequence of camera images from a camera and a sequence of gyroscope measurements from a gyroscope. The rotation, scale and non-orthogonality parameters may be used for an augmented reality application (referred to as an AR application or an AR app). These generated parameters may also be used for conditioning internal gyroscope measurement from a gyroscope found in a smartphone or tablet or other mobile device, without a need for factory calibration or external equipment. Calibration or conditioning may use only the pose measurements from tracking features in a sequence of images from a camera along with gyroscope measurements.

AR applications typically offer a user-interactive experience that supplement a real world scenario, rather than creating a virtual reality like an artificial environment. In AR, the user's surroundings may form the backdrop for augmentation by computer generated graphics, and other types of annotations and animations.

In some embodiments, poses (generated from a sequence of images passed through a computer vision algorithm) and a sequence of gyroscope vectors (generated from raw gyroscope measurements) may be used to solve for mobile device misalignment as well as to condition raw gyroscope measurements to account for scale and non-orthogonality errors pertaining to the raw gyroscope measurements. The computer vision pose (i.e., pose angular vector ($\omega_{cam}$)) and gyro measurements are related by a composite matrix (B) that is a solution of a linear system.

A decomposition of the composite matrix (B) may be performed by several methods, including QR factorization (also known as QR decomposition). In QR factorization, the decomposition separates the composite matrix (B) into an orthogonal rotation matrix ($R_{cb}$) and an upper triangular matrix (A) (also referred to as a scale and non-orthogonality matrix (A)). The upper triangular matrix (A) includes both scale and non-orthogonality adjustments, which may be used to calibrate subsequent gyroscope measurements.

In some embodiments, Kalman filtering may be applied to derive scale and non-orthogonality parameters. In Kalman filtering, a Kalman filter (e.g., a recursive Extendent Kalman filter (EKF)) uses both pose angular rotation ($\omega_{cam}$) and translation (T) along with the gyroscope vector to estimate the state space that consists of the scale and non-orthogonality matrix (A) and rotational matrix ($R_{cb}$). Using translation (T) of the computer vision pose in addition to rotation ($\omega_{cam}$) may boost accuracy in AR apps.

FIG. 1 shows a simplified block diagram of exemplary mobile device 10, which is capable of generating a rotation matrix ($R_{cb}$) and scale and non-orthogonality matrix (A), in a manner consistent with disclosed embodiments. In some embodiments, mobile device 10 may comprise exemplary camera 100, and gyroscope 200, which may both be coupled to exemplary processor 300. Camera 100 may capture a sequence of images at various points in time. In some embodiments, camera 100 may be capable of capturing still and video images of various resolutions and/or frame rates.

In some embodiments, camera 100 may be coupled to one or more calibrated sensors, which may be provide information relating to the orientation of a target relative to the camera axis. These sensors may include, but are not limited to, an orientation sensor, a magnetic field sensor, etc. The sequence of images captured by camera 100 may be stored in a memory and/or an image buffer and/or video buffer accessible by processor 300. In some embodiments, camera 100 may capture images independently at various points in time and send the images to a processor.

In some embodiments, processor 300 may be able to compute a pose based in part on the information provided in the images captured by camera 100. In some embodiments, processor 300 may also use information from sensors coupled to camera 100. The term "pose" is used to indicate a position and orientation of a camera with respect to a target. For example, when a target is tracked across multiple image frames, one of the image frames may be used as a reference frame and the pose for other frames in the image sequence may be expressed as a function of the reference frame. Camera orientation information for an image sequence may be expressed as a sequence of pose angular vectors ($\omega_{cam}$). In some embodiments, not all frames may have pose estimates. For example, the processor may skip frames and there may also be intermittent blackout periods.

For a 3-D image representation, the pose angular vector ($\omega_{cam}$) may comprise three components—one for each dimension. In addition, processor 300 may also compute the translation or spatial displacement of the camera relative to the position of the camera in the reference frame using features in the sequence of images and information obtained from sensors coupled to camera 100. In some embodiments, the translation for each pair of images in a sequence of images may be stored in a translation matrix (T).

Gyroscope 200 may capture a sequence of raw measurements ($\omega_{gyro-meas}$), which may include raw angular velocity measurements. As will be described later, the gyroscope 200 may act as a means for deriving rotation information, a means for receiving the scale and non-orthogonality matrix, and/or a means for calibrating the sequence of raw gyroscope measurements using the scale and non-orthogonality matrix. In other embodiments, one or more other elements may be used instead of or in addition to the gyroscope 200 to implement such means. In some embodiments, raw gyro measurements ($\omega_{gyro-meas}$) may be provided after a configurable number of clock cycles of a system clock on mobile device 10 and/or at regular time intervals. In some embodiments, the raw angular velocity measurements may comprise three components, for example, one for each of the x, y and z axes. In some embodiments, the sequence of raw gyroscope measurements ($\omega_{gyro-meas}$) may be stored in a buffer (not shown) that may be accessed by processor 300.

In general processor 300 may be a Central Processing Unit (CPU), a multi-core CPU, microprocessor, microcontroller, Application Specific Integrated Circuit (ASIC), an embedded processor, a Digital Signal Processor (DSP) or any other processor capable of operating in mobile device 10 and performing functions disclosed herein. Processor 300 may be capable of executing program code in memory, in firmware, and/or from media coupled to mobile device 10 in a manner consistent with embodiments disclosed herein.

In some embodiments, processor 300 may process the buffered sequence of gyroscope measurements ($\omega'_{gyro-meas}$) to estimate a sequence of gyroscope vectors ($\omega_{gyro}$) so that the sequence of gyroscope vectors ($\omega_{gyro}$) and the sequence of pose angular vectors ($\omega_{cam}$) are synchronized in time. In some embodiments, the sequence of gyroscope vectors ($\omega_{gyro}$) may each include three components: one for each of the x, y and z axes. In some embodiments, the sequence of images and the sequence of gyroscope vectors ($\omega_{gyro}$) may be time-stamped or otherwise indexed to permit the association of a pose angular vector ($\omega_{cam}$) with an image with a corresponding gyroscope vector ($\omega_{gyro}$).

Raw gyroscope measurements ($\omega_{gyro-meas}$) typically suffer from errors. For example, the axes of gyroscope 200 may be non-orthogonal with respect to each other by a small amount, which may affect the accuracy of raw angular velocity measurement ($\omega_{gyro-meas}$) and cause non-orthogonality errors. In addition, gyroscopes, such as gyroscope 200, may also exhibit other deterministic errors—such as bias and scale errors. A gyroscope bias error ($\omega_{bias}$) can result, for example, when gyroscope 200 registers some raw non-zero gyroscope (angular velocity) measurement ($\omega_{gyro-meas}=\omega_{bias}\neq 0$), when gyroscope 200 is in fact not rotating ($\omega_{true}=0$), where $\omega_{true}$ is the true gyroscope (angular velocity) measurement. After compensation for bias, if gyroscope 200 registers raw gyroscope (angular velocity) measurement ($\omega_{gyro-meas}$, where $\omega_{gyro-meas}=\alpha\omega_{true}$), then "$\alpha$" is termed the scale factor or scale error. In some embodiments, the sequence of raw gyroscope measurements ($\omega_{gyro-meas}$) may be processed prior to storage in the buffer.

In some embodiments, processor 300 may use the sequence of pose angular vectors ($\omega_{cam}$) and the sequence of gyroscope vectors ($\omega_{gyro}$) to compute orthogonal rotation matrix $R_{cb}$ and/or a scale and non-orthogonality matrix (A). In some embodiments, the bias error ($\omega_{bias}$) may also be optionally estimated by processor 300 as indicated by the dashed arrow in FIG. 1. In some embodiments, scale and non-orthogonality matrix (A) matrix includes both scale and non-orthogonality adjustments, which may be used to calibrate subsequent gyroscope measurements. In some embodiments, the scale and non-orthogonality adjustments or parameters, and optionally bias error $\omega_{bias}$, may be used to condition measurements by gyroscope 200 and/or provided to an application, such as an AR application. Mobile device 10 may include additional elements that aren't illustrated. For example, the mobile device 10 may include input elements, other sensors, wireless communication means, a display, and/or modules to determine augmentations, and the like, for example based on the parameters described herein, and cause those augmentations and images to be shown on the display.

Figure 2:
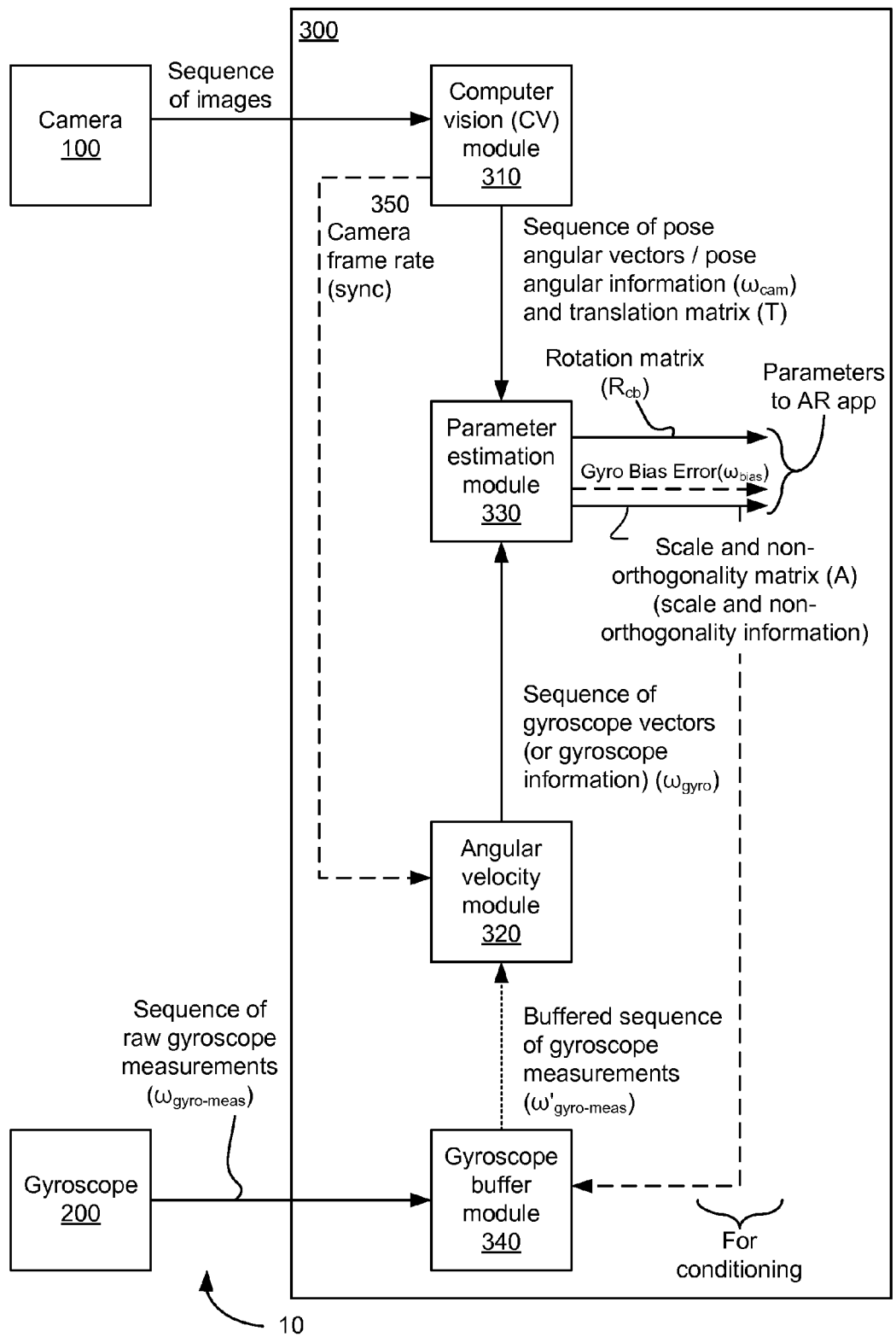
FIG. 2 is a block diagram of an exemplary mobile station comprising a processor and a variety of other modules coupled to the processor in a manner consistent with disclosed embodiments.

FIG. 2 is a block diagram of exemplary mobile device 10 comprising processor 300 and illustrating other modules coupled to the processor in a manner consistent with disclosed embodiments. In general, the modules shown may be implemented by some combination of hardware, software, and/or firmware.

As shown in FIG. 2, a sequence of images captured by camera 100 can be input to exemplary Computer Vision (CV) module 310 coupled to processor 300. In some embodiments, CV module 310 may select an image in the image sequence as a reference image and compute a pose angular vector ($\omega_{cam}$) or pose angular information for each image in the image sequence relative to the reference image. For example, the first image in the image sequence may be selected as a reference image and pose angular vectors ($\omega_{cam}$) for other images may be computed relative to the reference first image. Further, in some embodiments, CV module 310 may also compute a translation matrix (T) for the sequence of images. Additionally, in some embodiments, CV module 310 may output camera frame rate sync signal 350 to Angular Velocity (AV) module 320, which may be used to synchronize angular velocity measurements to captured frames in the image sequence. As such, the CV module 310 may act as a means for receiving a sequence of images from a camera, and/or a means for applying a computer vision algorithm to the sequence of images to generate a sequence of pose angular vectors. The AV module 320 may act as a means for estimating a sequence of gyroscope vectors from the buffered sequence of gyroscope measurements. In some embodiments, the sequence of gyroscope vectors and the sequence of pose angular vectors are synchronized. In other embodiments, one or more other elements may be used instead of or in addition to the CV module 310 and/or the AV module 320 to implement such means.

In some instances, CV module 310 may first run a detection step to detect a visual target and establish pose after which a tracking algorithm may update the pose. In some embodiments, the detection and tracking steps may be run in real time. In the tracking step, the location of a set of feature points may be computed in each frame. For example, the identification and location of a real-world feature in two separate image frames captured by camera 100 may yield feature correspondences, which can be used to tracking a target and estimate pose between frames.

Further, gyroscope 200 may capture a sequence of raw gyroscope measurements ($\omega_{gyro\text{-}meas}$), which may be buffered by exemplary gyroscope buffer module 340. The gyroscope buffer module 340 may act as a means for providing a buffered sequence of gyroscope measurements based on a sequence of raw gyroscope measurements from a gyroscope. As described below, the gyroscope buffer module 340 may act as a means for receiving the scale and non-orthogonality matrix and/or a means for conditioning the sequence of raw gyroscope measurements using the scale and non-orthogonality matrix. In other embodiments, one or more other elements may be used instead of or in addition to the gyroscope buffer module 340 to implement such means. In some embodiments, the buffered sequence of gyroscope measurements ($\omega'_{gyro\text{-}meas}$) may be output to exemplary AV module 320, which may use camera frame rate sync signal 350 to generate a sequence of gyroscope vectors ($\omega_{gyro}$) which are synchronized to the sequence of pose angular vectors ($\omega_{cam}$).

In some embodiments, the translation matrix (T) and sequence of pose angular vectors ($\omega_{cam}$) or pose angular information computed by CV module 310 may be input to exemplary parameter estimation module 330. The parameter estimation module 330 may act as a means for processing the sequence of pose angular vectors and the sequence of gyroscope vectors to derive scale information and non-orthogonality information. The parameter estimation module 330 may also act as a means for forwarding the scale information and non-orthogonality information to an augmented reality (AR) application. In other embodiments, one or more other elements may be used instead of or in addition to the parameter estimation module 330 to implement such means.

In addition, parameter estimation module 330 may also receive a sequence of gyroscope vectors ($\omega_{gyro}$) or gyroscope information from AV module 320, wherein the sequence of gyroscope vectors ($\omega_{gyro}$) or gyroscope information is synchronized to the sequence of pose angular vectors ($\omega_{cam}$) or pose angular information. Parameter estimation module 330 may use the received inputs to compute orthogonal rotation matrix ($R_{cb}$), scale and non-orthogonality matrix (A) or scale information and non-orthogonality information, and optionally gyroscope bias error ($\omega_{bias}$). In some embodiments, the rotation matrix $R_{cb}$, scale and non-orthogonality matrix (A), and/or gyroscope bias error ($\omega_{bias}$) may be input to an application, such as an AR application. In some embodiments, orthogonal rotation matrix ($R_{cb}$) and scale and non-orthogonality matrix (A) or scale information and non-orthogonality information may be input to gyroscope buffer module (as shown by the dashed line) and may be used to condition the buffered sequence of gyroscope measurements ($\omega'_{gyro\text{-}meas}$).

Figures 3, 4:
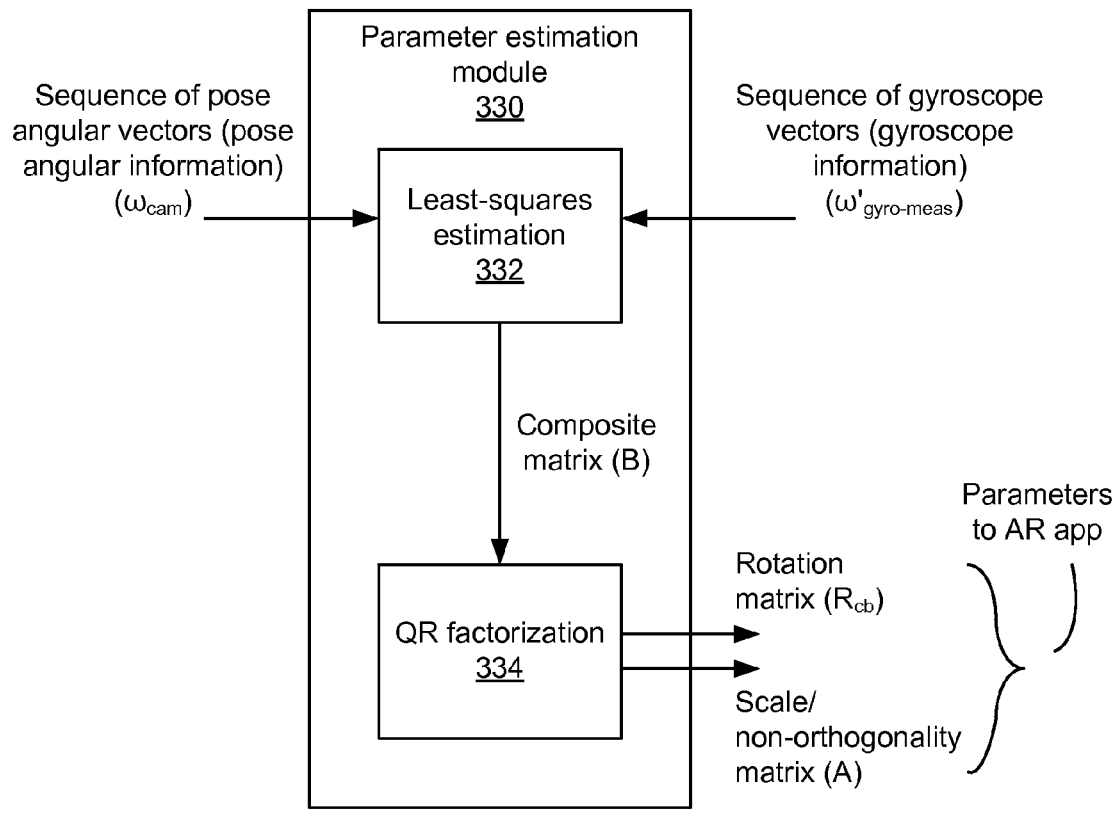
FIG. 3 shows a block diagram detailing some functions of an exemplary parameter estimation module.
FIG. 4 shows the relationship between composite matrix (B), and orthogonal rotation matrix ($R_{cb}$) and scale and non-orthogonality matrix (A).

FIG. 3 shows a block diagram detailing some functions of exemplary parameter estimation module 330. Parameter estimation module 330 may receive a sequence of pose angular vectors ($\omega_{cam}$) or pose angular information and a sequence of gyroscope vectors ($\omega_{gyro}$) or gyroscope information as inputs.

Because the gyroscopes typically have scale and non-orthogonality errors, estimation and correction of these errors facilitates obtaining camera body angular velocity measurements from the gyro measurements. In some embodiments, exemplary least squares estimation (LSE) module 332 may compute composite matrix B using the sequence of pose angular vectors ($\omega_{cam}$) and the corresponding buffered sequence of gyroscope measurements ($\omega_{gyro\text{-}meas}$) as discussed below.

The relationship between the measurements may be expressed as $$\omega_{gyro} = A\omega_{gyro\text{-}meas} \quad\quad 1$$

$$\omega_{cam} = R_{cb}A\omega_{gyro\text{-}meas} = B\omega_{gyro\text{-}meas} \quad\quad 2$$

This is a Linear Least Squares Estimation problem where we solve for a general composite matrix $$B = R_{CB} \cdot A \quad\quad 3$$

that minimizes the following objective function $$\hat{B} = \operatorname{argmin}_t \sum \|\omega_{cam}(t) - B \cdot \omega_{gyro}(t)\|^2 \quad\quad 4$$

where, $\omega_{cam}(t)$ is the sequence of pose angular vectors at time t, $\omega_{gyro}(t)$ is the corresponding sequence of gyroscope measurements, and arg min stands for argument of the minimum, which is the set of points of the given argument for which the given objective function attains its minimum. B may be determined using Equation 4, which is a quadratic optimization problem whose solution is a linear system.

Once B has been computed by LSE module 332, composite matrix B may be input to exemplary QR factorization module 334. In some embodiments, Equation 3 may then be solved by QR factorization module 334 by decomposing B using QR decomposition to obtain orthogonal rotation matrix ($R_{cb}$) and scale and non-orthogonality matrix (A). As noted earlier, in some embodiments, orthogonal rotation matrix ($R_{cb}$) and/or scale and non-orthogonality matrix (A) may be input to an AR application. In some embodiments, orthogonal rotation matrix ($R_{cb}$) and scale and non-orthogonality matrix (A) may be used to condition raw sequence of gyroscope measurements ($\omega_{gyro\text{-}meas}$).

In some embodiments, translation information may not be used by parameter estimation module 330 to compute orthogonal rotation matrix ($R_{cb}$), and scale and non-orthogonality matrix (A) so that estimates of displacement or offset between camera and gyro centers may be ignored by parameter estimation module 330 if the translation information is input. In other embodiments, where parameter estimation module 330 does not use translation information to compute orthogonal rotation matrix ($R_{cb}$) and scale and non-orthogonality matrix (A), CV module 310 may not compute translation matrix (T).

FIG. 4 shows the relationship between composite matrix (B) 410, orthogonal rotation matrix ($R_{cb}$) 420 and scale and non-orthogonality matrix (A) 430 as shown in Equation 3. In some embodiments, scale and non-orthogonality matrix (A)

430 may be modeled as an upper triangular matrix. The diagonal elements of upper triangular scale and non-orthogonality matrix (A) are the scale parameters for the three axes, and the off-diagonal elements are the non-orthogonality parameters. After obtaining composite matrix B 410, Equation 3 may be solved for orthogonal rotation matrix ($R_{cb}$) 420 and scale and non-orthogonality matrix (A) 430 by decomposing composite matrix B 410 using QR decomposition techniques such as by QR factorization module 334.

Figure 5:
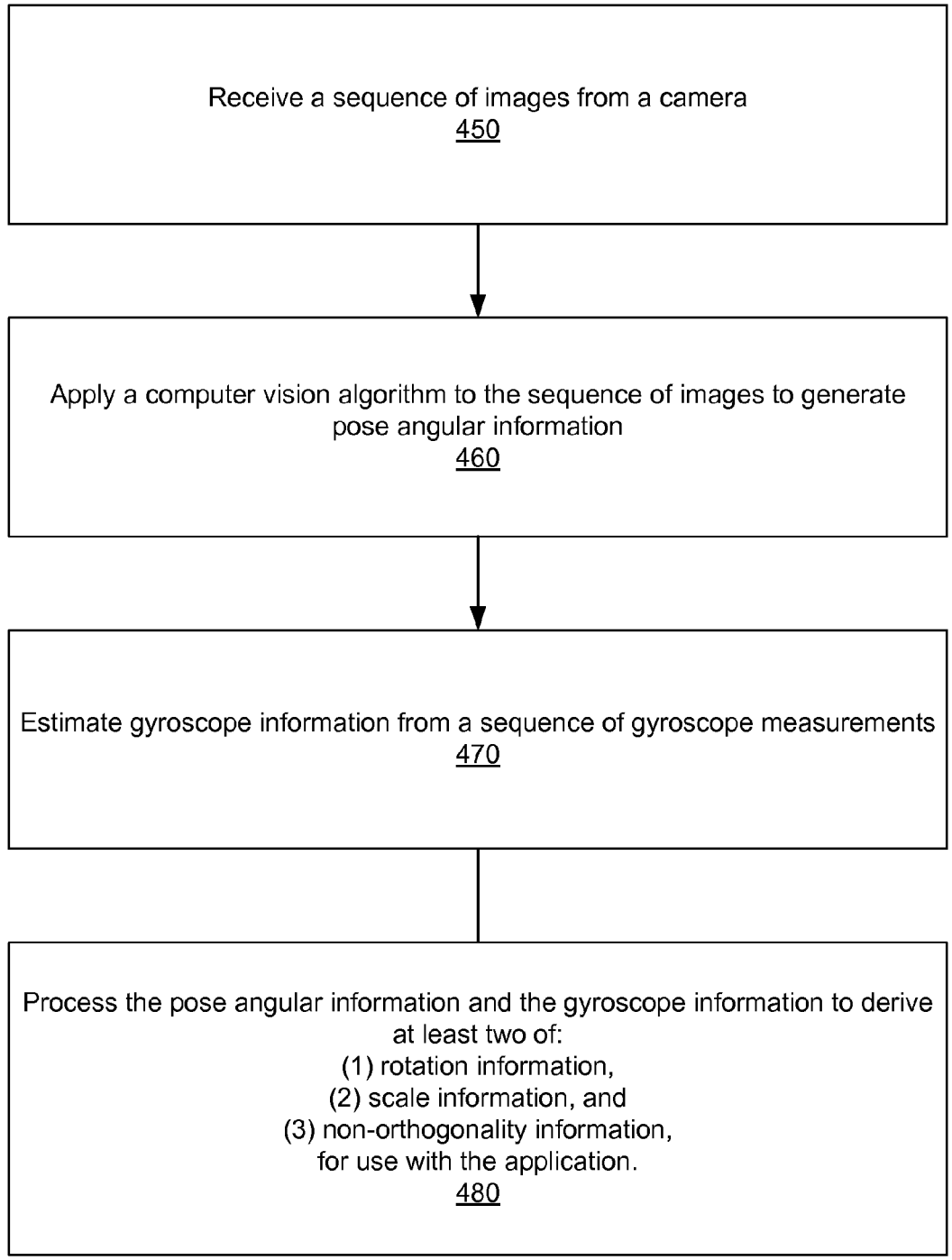
FIG. 5 shows a method in a mobile device for generating parameters for an application of the mobile device.

FIG. 5 shows a method in a mobile device for generating parameters for an application of the mobile device, for example the mobile device 10. For example, the application may be an augmented reality application. In some embodiments, the method illustrated in FIG. 5 may be implemented on the mobile device. At 450, a processor, for example the processor 300, or other computing element may receive a sequence of images from a camera, for example, the camera 100. At 460, the processor may apply a computer vision algorithm to the sequence of images to generate pose angular information. In some embodiments, 460 is performed and/or implemented by the CV module 310. At 470, the processor may estimate gyroscope information from a sequence of gyroscope measurements, for example from the gyroscope 200. The gyroscope information and the pose angular information may be synchronized. In some embodiments, 470 is performed and/or implemented by the gyroscope buffer module 340 and/or the AV module 320.

At 480, the processor may process the pose angular information and the gyroscope information to derive at least two of: (1) rotation information, (2) scale information, and (3) non-orthogonality information, for use with the application. In some embodiments, 480 is performed and/or implemented by the parameter estimation module 330, least-squares estimation module 332, QR factorization module 334, and/or Kalman filter 326. In some examples, processing the pose angular information and the gyroscope information comprises computing a composite matrix from the pose angular information and the gyroscope information, and decomposing the composite matrix into a rotation matrix and a scale and non-orthogonality matrix, wherein the scale information and non-orthogonality information comprises the scale and non-orthogonality matrix. In some examples, computing the composite matrix comprises applying a least-squares estimation to the pose angular information and the gyroscope information. In some examples, decomposing the composite matrix comprises applying a QR factorization to the composite matrix. In some examples, processing the pose angular information and the gyroscope information may further comprise deriving an estimated gyroscope bias error. In some examples, processing the pose angular information and the gyroscope information comprises determining a translation matrix from the sequence of images, and applying the pose angular information, the translation matrix and the gyroscope information to a Kalman filter to compute the rotation information, the scale information and the non-orthogonality information. The pose angular information may be a sequence of pose angular vectors. In some embodiments, one or more of the functions illustrated in FIG. 5 may be omitted, transposed, and/or rearranged. For example, in some embodiments 470 is omitted. In such embodiments, the pose angular information and gyroscope measurements may be processed at 480. In some embodiments, the gyroscope information may be estimated at another device, component, and/or element. Other alterations of the method illustrated in FIG. 5 may be implemented in some embodiments.

Figure 6:
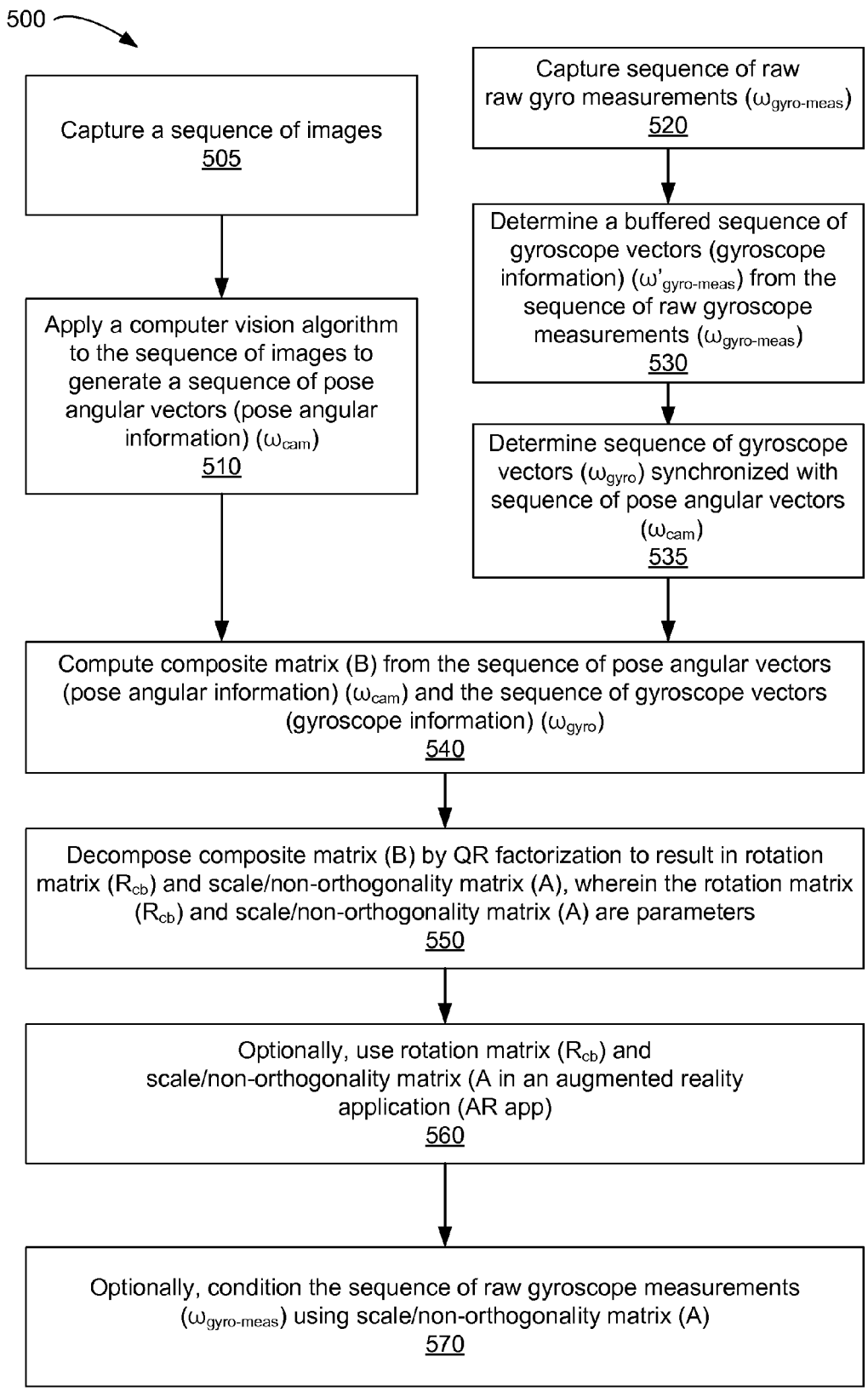
FIG. 6 shows a flowchart illustrating an exemplary method of deriving rotation matrix ($R_{cb}$) and scale and non-orthogonality matrix (A) from a sequence of images and a sequence of gyroscope measurements using QR factorization, in a manner consistent with disclosed embodiments.

FIG. 6 shows a flowchart illustrating an exemplary method 500 of deriving rotation matrix ($R_{cb}$) and scale and non-orthogonality matrix (A) from a sequence of images and a sequence of gyroscope measurements using QR factorization, in a manner consistent with disclosed embodiments. In some embodiments, method 500 may be implemented on a mobile device.

In some embodiments, in step 505, a sequence of images may be captured. For example, camera 100 may capture a sequence of images. Next, in step 510, a computer vision based algorithm may be applied to process the sequence of images and obtain a sequence of pose angular vectors ($\omega_{cam}$) or pose angular information for example, by CV module 310.

Concurrent with the capture of the image sequence (in step 505), a sequence of raw gyroscope measurements ($\omega_{gyro-meas}$) may be captured in step 520. For example, gyroscope 200 may capture the sequence of raw gyroscope measurements ($\omega_{gyro-meas}$) during the period when camera 100 is capturing a sequence of images. In step 530, a buffered sequence of gyroscope measurement vectors ($\omega'_{gyro-meas}$) or gyroscope information may be obtained from the sequence of raw gyroscope measurements ($\omega_{gyro-meas}$), for example, by gyroscope buffer module 340. In some embodiments, the sequence of raw gyroscope measurements ($\omega_{gyro-meas}$) may be processed prior to storage in a buffer. Next, in step 535, a sequence of gyroscope vectors ($\omega_{gyro}$) may be determined, for example, by AV module 320, using the buffered sequence of gyroscope measurements ($\omega'_{gyro-meas}$) so that the sequence of gyroscope vectors ($\omega_{gyro}$) and the sequence of pose angular vectors ($\omega_{cam}$) are synchronized in time.

In step 540, composite matrix (B) may be computed from the sequence of pose angular vectors (pose angular information) ($\omega_{cam}$) and the sequence of gyroscope vectors (gyroscope information) ($\omega_{gyro}$), for example, by parameter estimation module 330. In some embodiments, composite matrix (B) may be computed using equation 4.

Next, in step 550, composite matrix (B) may be decomposed using QR factorization to obtain rotation matrix ($R_{cb}$) and scale and non-orthogonality matrix (A), wherein the rotation matrix ($R_{cb}$) and scale and non-orthogonality matrix (A) are output parameters. For example, Equation 3 may be solved by decomposing B using QR decomposition to obtain orthogonal rotation matrix ($R_{cb}$) and scale and non-orthogonality matrix (A), for example, by QR factorization module 334.

In step 560, in some embodiments, orthogonal rotation matrix ($R_{cb}$) and/or scale and non-orthogonality matrix (A) may optionally be input to an AR application as shown in FIGS. 2 and 3.

In step 570, orthogonal rotation matrix ($R_{cb}$) and scale and non-orthogonality matrix (A) may optionally be used to condition raw sequence of gyroscope measurements ($\omega_{gyro-meas}$), as shown in FIG. 2 (dotted line). For example, orthogonal rotation matrix ($R_{cb}$) and scale and non-orthogonality matrix (A), and optionally bias error $\omega_{bias}$, may optionally be used as input to a function that conditions the buffered sequence of gyroscope measurements ($\omega'_{gyro-meas}$), for example at the gyroscope buffer module 340.

FIG. 7 shows a block diagram of an additional exemplary parameter estimation module consistent with disclosed embodiments. As shown in FIG. 7, parameter estimation module 330 may receive a sequence of pose angular vectors ($\omega_{cam}$) or pose angular information, Translation matrix (T) and a sequence of gyroscope vectors ($\omega_{gyro}$) or gyroscope information as inputs. In some embodiments, parameter estimation module 330 may comprise Kalman filter 326, which may receive the input sequence of pose angular vectors ($\omega_{cam}$) or pose angular information, Translation matrix (T) and the sequence of gyroscope vectors ($\omega_{gyro}$) or gyroscope information. Kalman filter 326 may then compute orthogonal rotation matrix ($R_{cb}$) and scale and non-orthogonality matrix (A), and optionally bias error $\omega_{bias}$. Kalman filters are well-known to persons of skill in the art. In some embodiments, Kalman filter 326 may take the form of a recursive Extendent Kalman Filter (EKF) described further below.

FIG. 8 shows a set of equations describing the relationships between various parameters in a mobile device. In some embodiments, the relationships described by the equations may be used by an exemplary EKF to derive rotation matrix ($R_{cb}$) and scale and non-orthogonality matrix (A), and optionally bias error ($\omega_{bias}$), from measurements made by mobile device 10. A mathematical description and model of the relationships between the various sensor parameters for a mobile device may be found in the documents: "Vision Inertial Integration: Hybrid VINS" January 2011, Stefano Soatto, (hereinafter "Soatto") and "Visual-Inertial Navigation, Localization and Mapping: A Scalable Real-time Large Scale Approach", *International Journal of Robotics Research*, Eagle Jones and Stefano Soatto (hereinafter "Jones") which are hereby incorporated by reference in their entirety. The parameters used to describe the relationships and the equations relating the parameters are outlined and briefly explained in general terms below.

The subscript "cb" is used to denote calibration parameters. Some of these parameters are assumed to have been estimated at a calibration stage and may be assumed to be invariant during the operation of the EKF. The subscript "sb" is used to denote parameters pertaining to orientation of the gyroscope with respect to the spatial coordinate system.

A discrete-time version (relating values of a parameter at time "t" to its value at time "t+dt") of model dynamics may be used to determine the dynamics of body orientation—as explained further below. The camera-to-gyroscope rotation alignment is denoted by "$\hat{\Omega}_{cb}$," and the offset between the two sensors is denoted by "$T_{cb}$." Accordingly, using the model in Jones, equations for $\hat{\Omega}_{cb}$ and $\hat{\Omega}_{sb}$ may be written as, $$\Omega_{cb}(t+dt)=\Omega_{cb}(t) \qquad 5$$

$$\Omega_{sb}(t+dt)=\text{Log}_{SO3}(\exp(\hat{\Omega}_{sb}(t))\cdot\exp(w(t)dt)) \qquad 6$$

Typically, gyroscope readings may include measurements of the angular velocity $\omega(t)$ and acceleration $a(t)$. The dynamics of the angular velocity and acceleration are shown in equations 7 and 8 below.

$$\omega(t+dt)=\omega(t)+n_w(t) \qquad 7$$

$$a(t+dt)=a(t)+n_a(t) \qquad 8$$

where, $n_\omega(t)$ and $n_a(t)$ model white noise in the gyroscope angular velocity and acceleration readings, respectively Let $T_{sb}(t)$ and $v(t)$ denote the position and velocity, respectively, derived from measurements made by the gyroscope with respect to the spatial coordinate system. Further, let $\gamma(t)$ represent the gravity vector in the spatial coordinate system, let $n_\gamma(t)$ model white noise in the gravity estimate, and let $\omega_{bias}(t)$ and $a_{bias}(t)$ represent the slowly varying gyroscope and acceleration bias errors that are estimated as state parameters. Then, the dynamics of the position (displacement), velocity, and gravity are as shown in Equations 9, 10 and 11, respectively.

$$T_{sb}(t+dt)=T_{sb}(t)+v(t)dt \qquad 9$$

$$v(t+dt)=v(t)+\exp(\hat{\Omega}_{sb}(t))\cdot a(t)dt+\gamma dt \qquad 10$$

$$\gamma(t+dt)=\gamma(t)+n_\gamma(t) \qquad 11$$

$$\omega_{bias}(t+dt)=\omega_{bias}(t) \qquad 12$$

Equations 5-12 represent a general model relating parameters measured and/or associated with various sensors on a mobile device and may be used in an EKF to derive a model for estimating the rotational alignment along with scale and non-orthogonality of gyroscope 200 in mobile device 10. Specifically, measurement equations relating the measurements of gyroscope 200 and camera 100 are similar to the rotation and translation filter, and are reproduced below.

$$\omega'_{gyro-meas}(t)=A\cdot\omega(t)+\omega_{bias}(t)+n_w(t) \qquad 13$$

$$\Omega_{cam}(t_k)=\text{Log}_{SO3}(\exp(\hat{\Omega}_{sb}(t_k))\cdot\exp(-\hat{\Omega}_{cb}))+n_{vis}(t_k) \qquad 14$$

$$T(t_k)=T_{sb}-\exp(\hat{\Omega}_{sb}(t_k))\cdot\exp(-\hat{\Omega}_{cb})\cdot T_{cb}+n_{vis}(t) \qquad 15$$

where, A is the scale and non-orthogonality matrix, which is modeled as upper triangular; $\omega'_{gyro-meas}(t)$ is the buffered sequence of gyroscope measurements at times t, and the sequence of pose angular vectors, $\omega_{cam}(t_k)$, is the derivative of $\Omega_{cam}(t_k)$. $\Omega_{cam}(t_k)$ may be computed from $\omega_{cam}(t_k)$ using formulae relating to the exponential coordinates for rotation matrices. The diagonal elements of A are the scale parameters for the three axes, and the off-diagonal elements are the non-orthogonality parameters. Since scale and non-orthogonality parameters are assumed to be invariant during calibration, Equation 13 assumes constant dynamics for scale and non-orthogonality matrix A.

In Equations 13-15 above, the camera-to-gyroscope rotation alignment $\Omega_{cb}$ and scale and non-orthogonality matrix A are the unknown parameters and the problem is one of parameter identification that we convert to a filtering problem. The alignment, scale and non-orthogonality parameters do not change during calibration and this is reflected in the equations above, where the noise for evolution of $\Omega_{cb}$ and scale and non-orthogonality matrix A is zero. Further, orthogonal rotation matrix $R_{cb}$ is the exponential of $\Omega_{cb}$, where the exponential may be obtained using the well-known Rodrigues' rotation formula.

In some embodiments, a recursive solution using equations 13-15 above may be computed, for example, by Kalman filter 326. The filter is initialized with an initial estimate of $\Omega_{cb}$ and A, which may initially obtained from specification documents or otherwise estimated. In some instances, gyroscope bias errors ($\omega_{bias}(t)$) may be unknown. However, because bias errors may be assumed constant over time, they can be estimated by Kalman filter 326.

Figure 9:
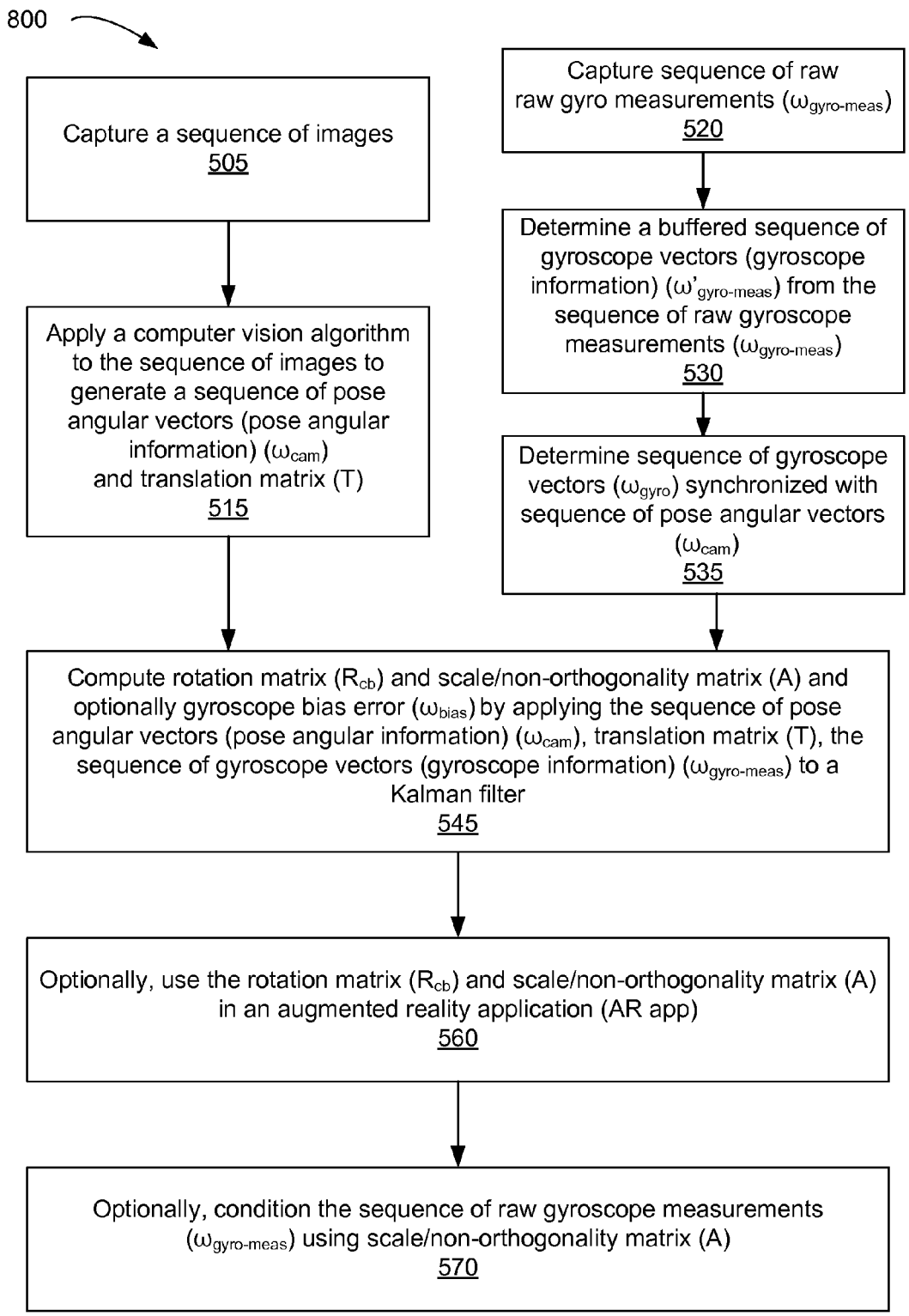
FIG. 9 shows a flowchart illustrating an exemplary method to derive rotation matrix ($R_{cb}$) and scale and non-orthogonality matrix (A) and optionally gyroscope bias error ($\omega_{bias}$) from a sequence of images and a sequence of gyroscope measurements by using a Kalman filter in a manner consistent with disclosed embodiments.

FIG. 9 shows a flowchart illustrating an exemplary method 800 to derive a rotation matrix ($R_{cb}$) and a scale and non-orthogonality matrix (A) from a sequence of images and a sequence of gyroscope measurements by using a Kalman filter in a manner consistent with disclosed embodiments. In some embodiments, the Kalman filter may take the form of the EKF.

In some embodiments, method 800 of FIG. 9 may be implemented on a mobile device. In some embodiments, in step 505, a sequence of images may be captured. For example, camera 100 may capture a sequence of images. Next, in step 515, a computer vision based algorithm may be applied to process the sequence of images and obtain a sequence of pose angular vectors ($\omega_{cam}$) or pose angular information and a translation matrix (T), for example, by CV module 310.

Steps 520, 530 and 535 may occur concurrently and are described with respect to FIG. 6. In step 545, rotation matrix ($R_{cb}$) and scale and non-orthogonality matrix (A) and optionally gyroscope bias error ($\omega_{bias}$) may be computed by applying the sequence of pose angular vectors ($\omega_{cam}$) or pose angular information, translation matrix (T), and the sequence of gyroscope vectors ($\omega_{gyro-meas}$) or gyroscope information, to a Kalman filter, which may, in part, use recursive techniques in conjunction with equations 13-15 above. In some embodiments, $\Omega_{cam}(t_k)$ may be computed from $\omega_{cam}(t_k)$ using formulae relating to the exponential coordinates for rotation matrices. Steps 560 and 570 are also described above with respect to FIG. 6.

The rotation matrix ($R_{cb}$) and/or scale and non-orthogonality matrix (A) may be used as inputs to an AR application. For example, the AR application may use one, two or all three of: (1) the rotation matrix ($R_{cb}$), (2) scale information, and (3) non-orthogonality information to pre-process the raw gyroscope measurements ($\omega_{gyro\text{-}meas}$) and/or obtain camera angular velocities in the frame of reference of the camera 100. The scale information and the non-orthogonality information may both be within the scale and non-orthogonality matrix (A). These angular velocities may be integrated over a time interval to determine incremental rotation of the camera 100 (and/or mobile device 10) in the time interval. This may allow the AR application to determine if and/or how the camera 100 and/or mobile device 10 has moved relative to a feature or object found in a displayed image. In this manner, the AR application may determine augmentations to be displayed and/or how to modify augmentations being displayed.

The phrases "in some embodiments" and "for example" may mean just an example rather than the best example. The methodologies described herein may be implemented by various means depending upon the application. For example, an element for applying a computer vision algorithm may comprise the CV module 310, or other means for applying a computer vision algorithm. For example, these methodologies may be implemented in hardware, firmware, software, or any combination thereof. For a hardware implementation, the processing units, for example the processor 300, may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Any of the modules described herein, for example the modules 310-340, may similarly be implemented in hardware.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Thus, any of the methods 500, 800, and/or the method illustrated in FIG. 5 may be implemented by a machine-readable medium and/or by various modules. Similarly, any of the modules 310-340 may be similarly implemented in firmware and/or software on a machine-readable medium. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer, or any other form of non-transitory medium; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for generating parameters for an application of the mobile device, the method comprising:
   receiving a sequence of images from a camera;
   applying a computer vision algorithm to the sequence of images to generate pose angular information;
   estimating gyroscope information from a sequence of gyroscope measurements; and
   processing the pose angular information and the gyroscope information to derive at least two of: (1) rotation information, (2) scale information, and (3) non-orthogonality information comprising:
   determining a translation matrix from the sequence of images; and
   applying the pose angular information, the translation matrix and the gyroscope information to a Kalman filter to compute at least two of: (1) the rotation information; (2) the scale information; and (3) the non-orthogonality information, for use with the application.

2. The method of claim 1, wherein the gyroscope information and the pose angular information are synchronized.

3. The method of claim 1, further comprising providing the sequence of gyroscope measurements by conditioning a sequence of raw gyroscope measurements using at least one of the scale information or the non-orthogonality information.

4. The method of claim 1, further comprising:
   applying at least one of the scale information and the non-orthogonality information to the application.

5. The method of claim 1, wherein processing the pose angular information and the gyroscope information comprises:
  computing a composite matrix from the pose angular information and the gyroscope information; and
  decomposing the composite matrix into a rotation matrix and scale and non-orthogonality matrix;
  wherein the scale information and the non-orthogonality information comprises the scale and non-orthogonality matrix.

6. The method of claim 5, wherein computing the composite matrix comprises applying a least-squares estimation to the pose angular information and the gyroscope information.

7. The method of claim 5, wherein decomposing the composite matrix comprises applying a QR factorization to the composite matrix.

8. The method of claim 1, wherein the pose angular information comprises a sequence of pose angular vectors.

9. The method of claim 1, wherein the sequence of gyroscope measurements comprises a buffered sequence of gyroscope measurements, and wherein estimating the gyroscope information from the sequence of gyroscope measurements comprises:
  obtaining a sequence of raw gyroscope measurements from a gyroscope; and
  buffering the sequence of raw gyroscope measurements to obtain the buffered sequence of gyroscope measurements.

10. The method of claim 9, wherein the gyroscope information comprises a sequence of gyroscope vectors.

11. The method of claim 1, wherein the application comprises an augmented reality application.

12. The method of claim 1, wherein processing the pose angular information and the gyroscope information further comprises deriving an estimated gyroscope bias error.

13. A mobile device for generating parameters for an application of the mobile device, the mobile device comprising:
  a camera configured to provide a sequence of images;
  a gyroscope configured to generate a sequence of gyroscope measurements; and
  a processor coupled to the camera and the gyroscope, wherein the processor comprises:
    a computer vision module coupled to receive the sequence of images from the camera, wherein the computer vision module generates pose angular information based on the sequence of images;
    an angular velocity module to generate gyroscope information from the sequence of gyroscope measurements; and
    a parameter estimation module coupled to receive the pose angular information from the computer vision module and coupled to receive the gyroscope information from the angular velocity module, wherein the parameter estimation module derives at least two of rotation information, scale information, and non-orthogonality information comprising:
      determining a translation matrix from the sequence of images; and
      applying the pose angular information, the translation matrix and the gyroscope information to a Kalman filter to compute at least two of the rotation information, the scale information and the non-orthogonality information, for use with the application of the mobile device.

14. The mobile device of claim 13, further comprising a gyroscope buffer module coupled to the parameter estimation module to receive the scale information and the non-orthogonality information, wherein the gyroscope buffer module is configured to condition a sequence of raw gyroscope measurements using the scale information and the non-orthogonality information.

15. The mobile device of claim 13, wherein the gyroscope is coupled to the parameter estimation module to receive the scale information and the non-orthogonality information, wherein the gyroscope is further to configured to calibrate a sequence of raw gyroscope measurements using the scale information and the non-orthogonality information.

16. The mobile device of claim 13, wherein the parameter estimation module further derives rotation information.

17. The mobile device of claim 13, wherein the parameter estimation module derives the scale information and the non-orthogonality information by:
  computing a composite matrix from the pose angular information and the gyroscope information; and
  decomposing the composite matrix into a rotation matrix and scale and non-orthogonality matrix, wherein the scale information and the non-orthogonality information comprises the scale and non-orthogonality matrix.

18. The mobile device of claim 17, wherein the parameter estimation module computes the composite matrix by applying a least-squares estimation to the pose angular information and the gyroscope information.

19. The mobile device of claim 13, wherein the scale information and the non-orthogonality information derived by the parameter estimation module is input to an augmented reality (AR) application.

20. A mobile device for generating parameters for an application of the mobile device, the mobile device comprising:
  means for receiving a sequence of images from a camera;
  means for applying a computer vision algorithm to the sequence of images to generate pose angular information;
  means for estimating gyroscope information from a sequence of gyroscope measurements; and
  means for processing the pose angular information and the gyroscope information to derive at least two of rotation information, scale information, and non-orthogonality information comprising:
    means for determining a translation matrix from the sequence of images; and
    means for applying the pose angular information, the translation matrix and the gyroscope information to a Kalman filter to compute at least two of the rotation information, the scale information and the non-orthogonality information, for use with the application of the mobile device.

21. The mobile device of claim 20, wherein the scale information, the scale information and the non-orthogonality information comprises a scale and non-orthogonality matrix.

22. The mobile device of claim 20, wherein the means for processing the pose angular information and the gyroscope information to derive at least two of the rotation information, the scale information and the non-orthogonality information comprises:
  means for processing a sequence of pose angular vectors and a sequence of gyroscope vectors to derive a scale and non-orthogonality matrix;
  wherein the pose angular information comprises the sequence of pose angular vectors;
  wherein the gyroscope information comprises the sequence of gyroscope vectors; and
  wherein the scale information and the non-orthogonality information comprises the scale and non-orthogonality matrix.

23. The mobile device of claim 20, further comprising:
means for receiving the scale information and the non-orthogonality information; and
means for conditioning a sequence of raw gyroscope measurements using the scale information and the non-orthogonality information.

24. The mobile device of claim 20, further comprising:
means for receiving the scale information and the non-orthogonality information; and
means for calibrating a sequence of raw gyroscope measurements using the scale information and the non-orthogonality information.

25. The mobile device of claim 20, further comprising means for deriving rotation information.

26. The mobile device of claim 20, wherein the means for processing the pose angular information and the gyroscope information to derive the scale information and the non-orthogonality information, further comprises:
means for computing a composite matrix from the pose angular information and the gyroscope information; and
means for decomposing the composite matrix into a rotation matrix and scale and non-orthogonality matrix;
wherein the scale information and the non-orthogonality information comprises the scale and non-orthogonality matrix.

27. The mobile device of claim 20, further comprising means for forwarding the scale information and the non-orthogonality information to an augmented reality (AR) application.

28. A mobile device for generating parameters for an application of the mobile device, the mobile device comprising a processor and a memory wherein the memory includes instructions for:
receiving a sequence of images from a camera;
applying a computer vision algorithm to the sequence of images to generate pose angular information;
estimating gyroscope information from a sequence of gyroscope measurements; and
processing the pose angular information and the gyroscope information to derive rotation information, scale information and non-orthogonality information for use with the application of the mobile device.

29. The mobile device of claim 28, wherein the memory further includes instructions for applying the scale information and the non-orthogonality information to the application, the application comprising an augmented reality application.

30. The mobile device of claim 28, wherein the instructions for processing the pose angular information and the gyroscope information to derive the rotation information, the scale information and the non-orthogonality information comprise instructions for:
determining a translation matrix from the sequence of images; and
applying the pose angular information, the translation matrix and the gyroscope information to a Kalman filter to compute the rotation information, the scale information and the non-orthogonality information.

31. A non-transitory computer-readable storage medium including program code stored thereon for generating parameters for an application of a mobile device, the program code comprising program code for:
receiving a sequence of images from a camera;
applying a computer vision algorithm to the sequence of images to generate pose angular information;
estimating gyroscope information from a sequence of gyroscope measurements; and
processing the pose angular information and the gyroscope information to derive at least two of rotation information, scale information and non-orthogonality information comprising program code for:
determining a translation matrix from the sequence of images; and
applying the pose angular information, the translation matrix and the gyroscope information to a Kalman filter to compute at least two of the rotation information, the scale information and the non-orthogonality information, for use with the application of the mobile device.

32. The non-transitory computer-readable storage medium of claim 31, wherein the program code further comprises program code for applying the scale information and the non-orthogonality information to an augmented reality application.

* * * * *